United States Patent
Subramanian et al.

(10) Patent No.: US 10,282,361 B2
(45) Date of Patent: May 7, 2019

(54) TRANSFORMING TIME SERIES DATA POINTS FROM CONCURRENT PROCESSES

(71) Applicant: salesforce.com, inc., San Francisco, CA (US)

(72) Inventors: Anand Subramanian, San Francisco, CA (US); Thomas Nicholas Valine, San Jose, CA (US); Bhinav Sura, San Mateo, CA (US); Rajavardhan Sarkapally, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 298 days.

(21) Appl. No.: 15/142,441

(22) Filed: Apr. 29, 2016

(65) Prior Publication Data

US 2017/0316067 A1    Nov. 2, 2017

(51) Int. Cl.
| | | |
|---|---|---|
| *G06F 17/30* | (2006.01) | |
| *G06F 16/25* | (2019.01) | |
| *G06F 21/62* | (2013.01) | |
| *G06F 16/23* | (2019.01) | |
| *G06F 16/2458* | (2019.01) | |

(52) U.S. Cl.
CPC ........ *G06F 16/254* (2019.01); *G06F 16/2343* (2019.01); *G06F 16/2477* (2019.01); *G06F 21/6227* (2013.01)

(58) Field of Classification Search
CPC ...................................................... G06F 17/30
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |

(Continued)

OTHER PUBLICATIONS

U.S. Appl. No. 13/986,251, filed Apr. 16, 2013.

*Primary Examiner* — Khanh B Pham
(74) *Attorney, Agent, or Firm* — Dergosits & Noah LLP; Todd A. Noah

(57) ABSTRACT

Transforming time series data points from concurrent processes is described. A time series database system writes, to a queue, a first time series data point received from a first process. The time series database system writes, to the queue, a second time series data point received from a second process that executes concurrently with the first process. The time series database system removes the first time series data point and the second time series data point from the queue. The time series database system creates transformed time series data by applying a transformation to the first time series data point and the second time series data point. The time series database system outputs the transformed time series data to a user device.

17 Claims, 3 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 7,970,927 B1 * | 6/2011 | Shao ................ G06F 9/5016 709/232 |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0122022 A1 * | 5/2014 | Chen ................ H04L 67/12 702/181 |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0134671 A1 * | 5/2015 | Lin ................ H04L 67/26 707/741 |
| 2015/0172563 A1 | 6/2015 | Jakobson et al. |
| 2015/0355975 A1 * | 12/2015 | Wang ................ G06F 11/1435 707/683 |

* cited by examiner

TRANSFORMING TIME SERIES DATA POINTS FROM CONCURRENT PROCESSES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Time series data is a sequence of data points, typically consisting of successive measurements made over a time interval. Examples of time series data are ocean tides, counts of sunspots, and the daily closing value of the Dow Jones Industrial Average. Time series data is frequently plotted via line charts. Many domains of applied science and engineering which involve temporal measurements use time series data. Time series data analysis comprises methods for analyzing time series data in order to extract meaningful statistics and other characteristics of the data. Time series data forecasting is the use of a model to predict future values based on previously observed values. A time series database is a computer system that is optimized for handling time series data. In some fields, time series data is called a profile, a curve, or a trace. Despite the disparate names, many of the same mathematical operations, queries, or database transactions are useful for analyzing each of these time series data types. The implementation of a computerized database system that can correctly, reliably, and efficiently implement these operations must be specialized for time series data.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
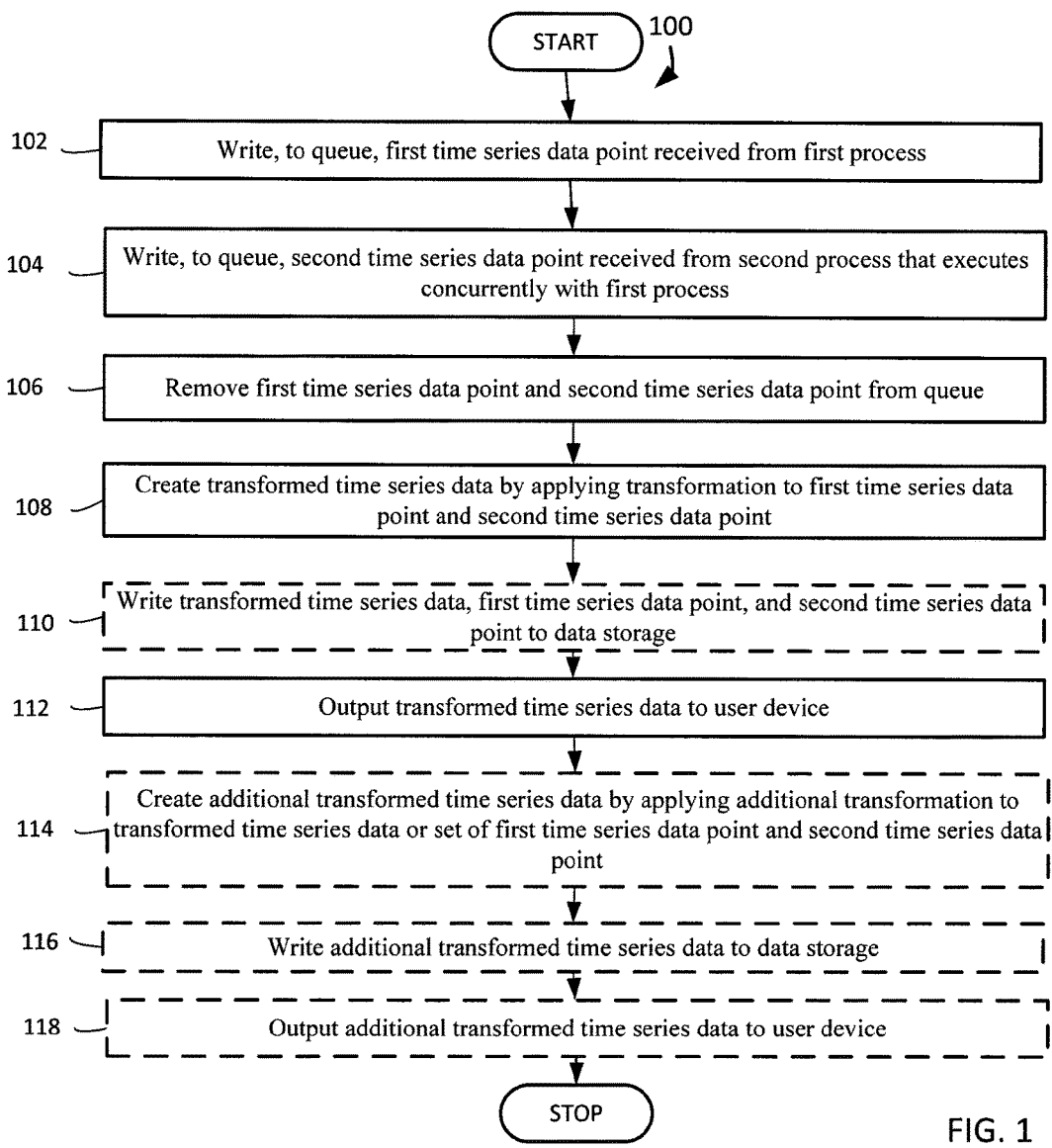
FIG. 1 is an operational flow diagram illustrating a high level overview of a method for transforming time series data points from concurrent processes, in an embodiment.

A software system may be monitored to determine the state of the software system at any given time. This monitoring may include the collection of key performance metrics at a regular cadence to construct a time series of data points that represent a performance metric over a time period. For a distributed software system consisting of many distinct computers, key performance metrics may be collected from each computer and stored as separate time series data points on a computer-by-computer basis. Once collected into a storage mechanism, these key performance metrics can be transformed to gain an overall view of each performance metric at a distributed system level.

In accordance with embodiments described herein, there are provided methods and systems for transforming time series data points from concurrent processes. A time series database system writes, to a queue, a first time series data point received from a first process. The time series database system writes to the queue, a second time series data point received from a second process that executes concurrently with the first process. The time series database system removes the first time series data point and the second time series data point from the queue. The time series database system creates transformed time series data by applying a transformation to the first time series data point and the second time series data point. The time series database system outputs the transformed time series data to a user device.

For example, the time series database system receives a first time series data point that indicates the first computer in a clustered network of computers has 2 gigabytes (GB) of free physical memory at 12:01 P.M., and writes the first time series data point of 2 GB to a protected access concurrent queue. The time series database system receives a second time series data point that indicates the second computer in the clustered network of computers has 4 GB of free physical memory at 12:01 P.M., and writes the second time series data point of 4 GB to the protected access concurrent queue. The time series database system removes the first time series data point of 2 GB and the second time series data point of 4 GB from the protected access concurrent queue. The time series database system aggregates the first time series data point of 2 GB and the second time series data point of 4 GB to create the transformed time series data that indicates the two computers in the clustered network of computers have a total of 6 GB of free physical memory at 12:01 P.M. The time series database system outputs an email to inform a system administrator for the time series database system that the two computers in the clustered network of computers have a total of only 6 GB of free physical memory at 12:01 P.M., which is less than the preferred minimum threshold of 6.4 GB of free physical memory. Previous time series database systems store time series data points to persistent data storage before retrieving the time series data points from the persistent data storage and only then applying a transformation to the time series data points. In contrast, the time series database system of the present disclosure uses a protected access concurrent queue to more efficiently create transformed time series data based on time series data points even before the time series data points are stored to persistent data storage.

Systems and methods are provided for transforming time series data points from concurrent processes. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and mechanisms for transforming time series data points from concurrent processes will be described with reference to example embodiments. The following detailed description will first describe a method for transforming time series data points from concurrent processes.

While one or more implementations and techniques are described with reference to an embodiment in which transforming time series data points from concurrent processes is implemented in a system having an application server providing a front end for an on-demand database service capable of supporting multiple tenants, the one or more implementations and techniques are not limited to multitenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

FIG. 1 is an operational flow diagram illustrating a high level overview of a method 100 for transforming time series data points from concurrent processes. A time series database system writes, to a queue, a first time series data point received from a first process, block 102. For example and without limitation, this can include the time series database system receiving a first time series data point that indicates the first computer in a clustered network of computers has 2 GB of free physical memory at 12:01 P.M. While this example describes the time series database system receiving a time series data point from a process corresponding to a single time period, the time series database system may receive a time series data point from a process corresponding to multiple time periods, such as a specific computer's free physical memory at 12:01 P.M., 12:02 P.M., 12:03 P.M., 12:04 P.M., and 12:05 P.M. Even though this example describes the time series database system receiving a time series data point that specifies minutes, such as a time series data point received on a minute-to-minute basis, the periodic receiving period may be of any time duration, such as seconds or hours. Although this example describes a time series data point received from an external system process, the time series database system may receive the time series data point from an internal system process. The time series database system may receive the time series data points from a non-real time system or in real time from a real time system.

Having received the first time series data point from the first process, the time series database system writes the first time series data point to a queue. By way of example and without limitation, this can include the time series database system acquiring a lock on a protected access concurrent queue, writing the first time series data point of 2 GB to the protected access concurrent queue, and releasing the lock on the protected access concurrent queue. While this example describes the time series database system writing a time series data point corresponding to a single time period to a queue, the time series database system may write the time series data point corresponding to multiple time periods, such as a specific computer's free physical memory at 12:01 P.M., 12:02 P.M., 12:03 P.M., 12:04 P.M., and 12:05 P.M.

Further, although this example describes the time series database system acquiring a lock on the protected access concurrent queue and releasing the lock on the protected access concurrent queue, the time series database system may use alternative means to protect a protected access concurrent queue from other access and enable other access to the protected access concurrent queue. The time series database system may create a protected access concurrent queue specifically for storing and removing time series data points.

After writing the first time series data point to the queue, the time series database system writes, to the queue, a second time series data point received from a second process that executes concurrently with the first process, block 104. In embodiments, this can include the time series database system receiving a second time series data point that indicates the second computer in the clustered network of computers has 4 GB of free physical memory at 12:01 P.M.

Having received the second time series data point from the second process, the time series database system writes the second time series data point to the queue. For example and without limitation, this can include the time series database system acquiring the lock to the protected access concurrent queue, writing the second time series data point of 4 GB to the protected access concurrent queue, and releasing the lock to the protected access concurrent queue. While this example describes the time series database system receiving two time series data points corresponding to two concurrent processes and writing the two time series data points to a queue, the time series database system may receive any number of time series data points from any number of concurrent processes, and write any number of time series data points to a queue.

After writing the first and second time series data points to the queue, the time series database system removes the first and second time series data points from the queue, block 106. By way of example and without limitation, this can include the time series database system acquiring the lock to the protected access concurrent queue, removing the first time series data point of 2 GB and the second time series data point of 4 GB from the protected access concurrent queue, releasing the lock to the protected access concurrent queue, and moving the first time series data point and the second time series data point to a raw data buffer.

Although this example describes the time series database system acquiring a lock on the protected access concurrent queue and releasing the lock on the protected access concurrent queue, the time series database system may use alternative means to protect a protected access concurrent queue from other access and enable other access to the protected access concurrent queue. For example, the time series database system may provide a first lock for the rear of a queue that threads use to write time series data points to the queue, and provide a second lock for the front of the queue that threads use to remove time series data points from the queue. While the 2 GB and 4 GB example describes the time series database system removing two time series data points corresponding to one time period from a queue, the time series database system may remove any number of time series data points corresponding to any number of time periods from a queue.

The time series database system may create a temporary data structure, which may be referred to as a raw data buffer, specifically for storing time series data points removed from a queue. The time series database system may not remove time series data points corresponding to a specific time until after the queue has stored a sufficient amount of time series data points corresponding to the specific time. For example, if a queue has stored the time series data point for 11:59 A.M.'s CPU utilization for only one computer in a clustered network of ten computers, the time series database system does not remove this time series data point from the queue, but after the queue has stored the time series data point for 11:59 A.M.'s CPU utilization for at least nine computers in the clustered network of ten computers, the time series database system removes these time series data points from the queue.

Having removed the first and second time series data points from the queue, the time series database system creates transformed time series data by applying a transformation to the first time series data point and the second time series data point, block 108. In embodiments, this can include the time series database system aggregating a copy of the first time series data point of 2 GB from the raw data buffer and a copy of the second time series data point of 4 GB from the raw data buffer to create the transformed time series data that indicates the two computers in the clustered network of computers have a total of 6 GB of free physical memory at 12:01 P.M., and writing the transformed time series data of 6 GB to a transformed data buffer. Although this example describes the time series database system creating transformed time series data by applying an aggregation transformation to time series data points, the time series database system may create transformed time series data by applying any type of transformation to time series data points, such as a transformation that identifies the maximum value of the time series data points. Such a transformation may be referred to as a filter, examples of which also include a smoothing filer, a statistical analysis filter, and a non-seasonal decomposition filter.

A transformation that uses the transformed time series data from a previous transformation may be referred to as a chained transformation or a chained filter. The time series database system may create transformed time series data by selectively applying transformations to time series data points. For example, the time series database system may apply a first transformation to a first set of time series data points that indicate free physical memory in a clustered network of computers at 12:01 P.M., apply a second transformation to a second set of time series data points that indicate CPU utilization in the clustered network of computers at 12:01 P.M., and apply no transformation to a third set of time series data points that indicate some other performance metric in the clustered network of computers at 12:01 P.M.

Having created the transformed time series data based on the first time series data point and the second time series data point, the time series database system optionally writes the transformed time series data, the first time series data point, and the second time series data point to a data storage, block 110. For example and without limitation, this can include the time series database system writing the transformed time series data of 6 GB, the first time series data point of 2 GB, and the second time series data point of 4 GB to persistent data storage. The time series database system may write the transformed time series data initially to a transformed data buffer and subsequently write the transformed time series data from the transformed data buffer to persistent data storage. The time series database system may create a temporary data structure, called a transformed data buffer, specifically for storing transformed time series data until the transformed time series data may be efficiently written to persistent data storage.

Having created the transformed time series data, the time series database system outputs the transformed time series data to a user device, block 112. By way of example and without limitation, this can include the time series database system outputting an email to inform a system administrator for the time series database system that the two computers in the clustered network of computers have a total of only 6 GB of free physical memory at 12:01 P.M., which is less than the preferred minimum threshold of 6.4 GB of free physical memory. While this example describes the time series database system outputting the transformed time series data after the example of the time series database system writing the transformed time series data to persistent data storage, the time series database system may output the transformed time series data before writing the transformed time series data to the persistent data storage.

In contrast to previous time series database systems, the time series database system of the present disclosure uses a protected access concurrent queue to more efficiently create transformed time series data based on time series data points even before the time series data points are stored to persistent data storage. Although this example describes the time series database system communicating the transformed time series data via an email, the time series database system may communicate the transformed time series data via any combination of communications including responses to database queries, emails, text messages, display screen updates, audible alarms, social network posts, tweets, writes to database records, etc. The time series database system may also communicate the transformed time series data to a computer system, even the time series database system itself, in the form of control feedback, such that the computer system receiving the transformed time series data can take an action to mitigate an imminent failure.

The time series database system, having created the transformed time series data, optionally creates additional transformed time series data by applying an additional transformation to the transformed time series data or the set of the first time series data point and the second time series data point, block 114. In embodiments, this can include the time series database system dividing the transformed time series data that indicates the two computers in the clustered network of computers have a total of 6 GB of free physical memory at 12:01 P.M. by the 32 GB of total physical memory for the two computers in the clustered network of computers to create the additional transformed time series data that indicates the two computers in the clustered network of computers have a total of 18.75% of free physical memory at 12:01 P.M. In another example, the time series database system applies a maximum filter to the time series data points to determine that the second computer in the clustered network of computers with 4 GB of free physical memory at 12:01 P.M. is the clustered computer with the most free physical memory at 12:01 P.M., which may be used by a load balancer in the clustered network of computers.

Having created the additional transformed time series data, the time series database system optionally writes the additional transformed time series data to the data storage, block 116. For example and without limitation, this can include the time series database system writing the additional transformed time series data of 18.75% to a transformed data buffer and subsequently writing the transformed time series data from the transformed data buffer to the persistent data storage.

After writing the additional transformed time series data to the data storage, the time series database system optionally outputs the additional transformed time series data from the data storage, block 118. By way of example and without limitation, this can include the time series database system outputting an email to inform a system administrator for the time series database system that the two computers in the clustered network of computers have a total of only 18.75% of free physical memory at 12:01 P.M., which is less than the preferred minimum threshold of 20% of free physical memory.

The method 100 may be repeated as desired. Although this disclosure describes the blocks 102-118 executing in a particular order, the blocks 102-118 may be executed in a different order. In other implementations, each of the blocks 102-118 may also be executed in combination with other blocks and/or some blocks may be divided into a different set of blocks.

System Overview

Figure 2:
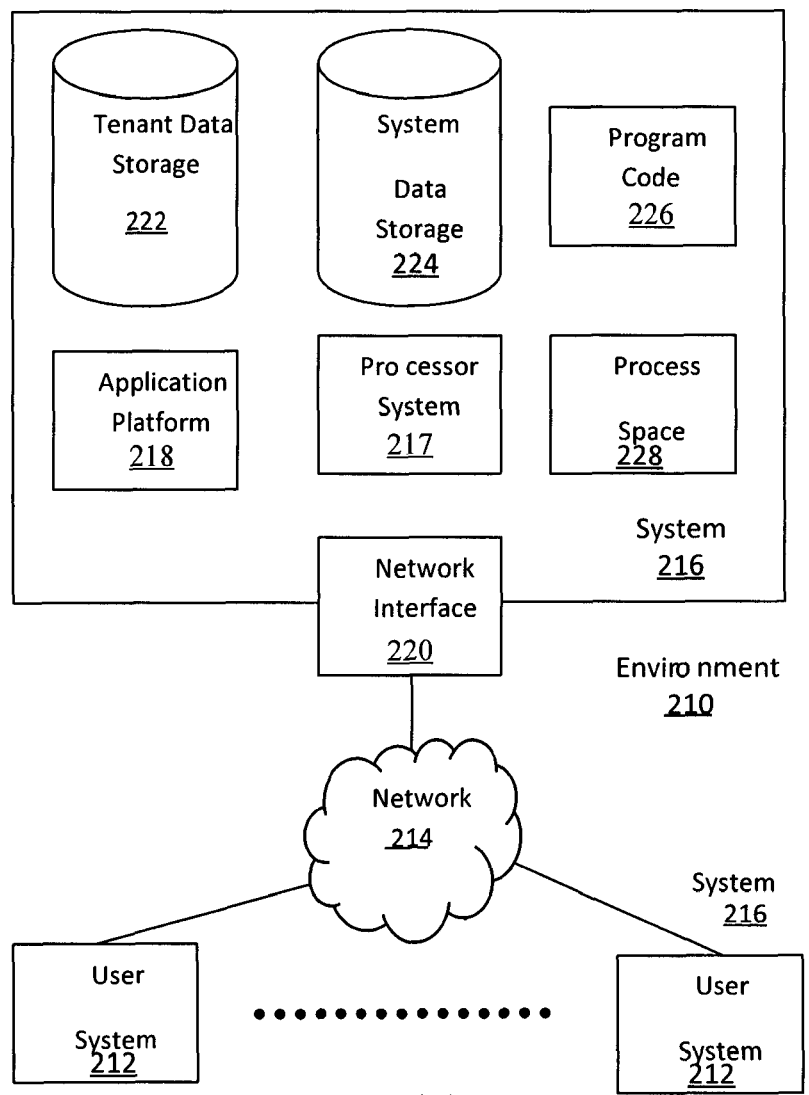
FIG. 2 illustrates a block diagram of an example of an environment wherein an on-demand database service might be used.

FIG. 2 illustrates a block diagram of an environment 210 wherein an on-demand database service might be used. The environment 210 may include user systems 212, a network 214, a system 216, a processor system 217, an application platform 218, a network interface 220, a tenant data storage 222, a system data storage 224, program code 226, and a process space 228. In other embodiments, the environment 210 may not have all of the components listed and/or may have other elements instead of, or in addition to, those listed above.

The environment 210 is an environment in which an on-demand database service exists. A user system 212 may be any machine or system that is used by a user to access a database user system. For example, any of the user systems 212 may be a handheld computing device, a mobile phone, a laptop computer, a work station, and/or a network of computing devices. As illustrated in FIG. 2 (and in more detail in FIG. 3) the user systems 212 might interact via the network 214 with an on-demand database service, which is the system 216.

An on-demand database service, such as the system 216, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 216" and the "system 216" will be used interchangeably herein. A database image may include one or more database objects. A relational database management system (RDMS) or the equivalent may execute storage and retrieval of information against the database object(s). The application platform 218 may be a framework that allows the applications of the system 216 to run, such as the hardware and/or software, e.g., the operating system. In an embodiment, the on-demand database service 216 may include the application platform 218 which enables creation, managing and executing one or more applications developed by the provider of the on-demand database service, users accessing the on-demand database service via user systems 212, or third party application developers accessing the on-demand database service via the user systems 212.

The users of the user systems 212 may differ in their respective capacities, and the capacity of a particular user system 212 might be entirely determined by permissions (permission levels) for the current user. For example, where a salesperson is using a particular user system 212 to interact with the system 216, that user system 212 has the capacities allotted to that salesperson. However, while an administrator is using that user system 212 to interact with the system 216, that user system 212 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 214 is any network or combination of networks of devices that communicate with one another. For example, the network 214 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 212 might communicate with the system 216 using TCP/IP and, at a higher network level, use other common Internet protocols to communicate, such as HTTP, FTP, AFS, WAP, etc. In an example where HTTP is used, the user systems 212 might include an HTTP client commonly referred to as a "browser" for sending and receiving HTTP messages to and from an HTTP server at the system 216. Such an HTTP server might be implemented as the sole network interface between the system 216 and the network 214, but other techniques might be used as well or instead. In some implementations, the interface between the system 216 and the network 214 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 216, shown in FIG. 2, implements a web-based customer relationship management (CRM) system. For example, in one embodiment, the system 216 includes application servers configured to implement and execute CRM software applications as well as provide related data, code, forms, webpages and other information to and from the user systems 212 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 216 implements applications other than, or in addition to, a CRM application. For example, the system 216 may provide tenant access to multiple hosted (standard and custom) applications, including a CRM application. User (or third party developer) applications, which may or may not include CRM, may be supported by the application platform 218, which manages creation, storage of the applications into one or more database objects and executing of the applications in a virtual machine in the process space of the system 216.

One arrangement for elements of the system 216 is shown in FIG. 2, including the network interface 220, the application platform 218, the tenant data storage 222 for tenant data 223, the system data storage 224 for system data 225 accessible to the system 216 and possibly multiple tenants, the program code 226 for implementing various functions of the system 216, and the process space 228 for executing MTS system processes and tenant-specific processes, such as running applications as part of an application hosting service. Additional processes that may execute on the system 216 include database indexing processes.

Several elements in the system shown in FIG. 2 include conventional, well-known elements that are explained only briefly here. For example, each of the user systems 212 could include a desktop personal computer, workstation, laptop, PDA, cell phone, or any wireless access protocol (WAP) enabled device or any other computing device capable of interfacing directly or indirectly to the Internet or other network connection. Each of the user systems 212 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 212 to access, process and view information, pages and applications available to it from the system 216 over the network 214. Each of the user systems 212 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 216 or other systems or servers. For example, the user interface device may be used to access data and applications hosted by the system 216, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 212 and all of its components are operator configurable using applications, such as a browser, including computer code run using a central processing unit such as an Intel Pentium® processor or the like. Similarly, the system 216 (and additional instances of an MTS, where more than one is present) and all of their components might be operator configurable using application(s) including computer code to run using a central processing unit such as the processor system 217, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 216 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 216 is configured to provide webpages, forms, applications, data and media content to the user (client) systems 212 to support the access by the user systems 212 as tenants of the system 216. As such, the system 216 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 3:
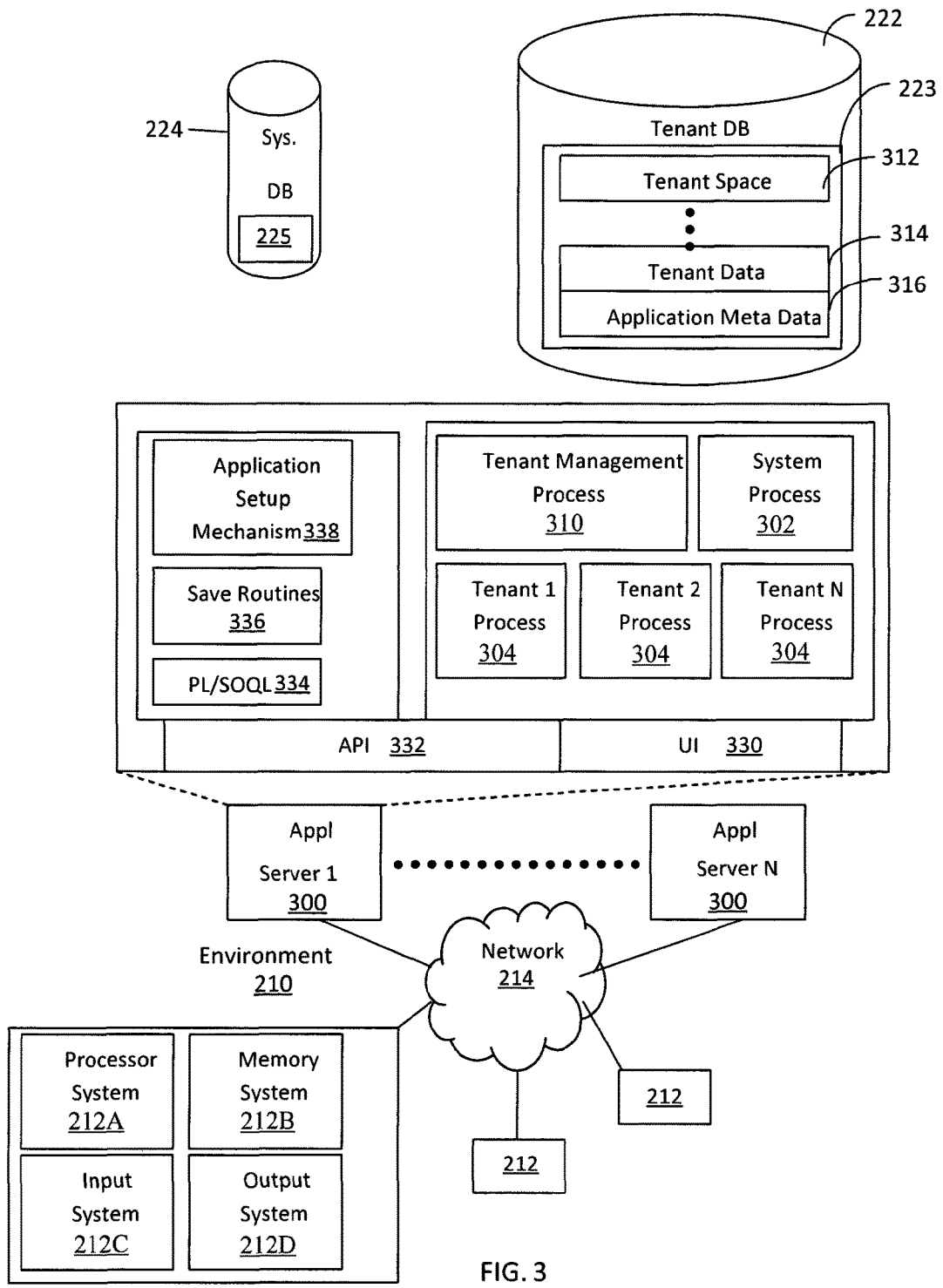
FIG. 3 illustrates a block diagram of an embodiment of elements of FIG. 2 and various possible interconnections between these elements.

FIG. 3 also illustrates the environment 210. However, in FIG. 3 elements of the system 216 and various interconnections in an embodiment are further illustrated. FIG. 3 shows that the each of the user systems 212 may include a processor system 212A, a memory system 212B, an input system 212C, and an output system 212D. FIG. 3 shows the network 214 and the system 216. FIG. 3 also shows that the system 216 may include the tenant data storage 222, the tenant data 223, the system data storage 224, the system data 225, a User Interface (UI) 330, an Application Program Interface (API) 332, a PL/SOQL 334, save routines 336, an application setup mechanism 338, applications servers $300_1$-$300_N$, a system process space 302, tenant process spaces 304, a tenant management process space 310, a tenant storage area 312, a user storage 314, and application metadata 316. In other embodiments, the environment 210 may not have the same elements as those listed above and/or may have other elements instead of, or in addition to, those listed above.

The user systems 212, the network 214, the system 216, the tenant data storage 222, and the system data storage 224 were discussed above in reference to FIG. 2. Regarding the user systems 212, the processor system 212A may be any combination of one or more processors. The memory system 212B may be any combination of one or more memory devices, short term, and/or long term memory. The input system 212C may be any combination of input devices, such as one or more keyboards, mice, trackballs, scanners, cameras, and/or interfaces to networks. The output system 212D may be any combination of output devices, such as one or more monitors, printers, and/or interfaces to networks. As shown by FIG. 3, the system 216 may include the network interface 220 (of FIG. 2) implemented as a set of HTTP application servers 300, the application platform 218, the tenant data storage 222, and the system data storage 224. Also shown is the system process space 302, including individual tenant process spaces 304 and the tenant management process space 310. Each application server 300 may be configured to access tenant data storage 222 and the tenant data 223 therein, and the system data storage 224 and the system data 225 therein to serve requests of the user systems 212. The tenant data 223 might be divided into individual tenant storage areas 312, which can be either a physical arrangement and/or a logical arrangement of data. Within each tenant storage area 312, the user storage 314 and the application metadata 316 might be similarly allocated for each user. For example, a copy of a user's most recently used (MRU) items might be stored to the user storage 314. Similarly, a copy of MRU items for an entire organization that is a tenant might be stored to the tenant storage area 312. The UI 330 provides a user interface and the API 332 provides an application programmer interface to the system 216 resident processes to users and/or developers at the user systems 212. The tenant data and the system data may be stored in various databases, such as one or more Oracle™ databases.

The application platform 218 includes the application setup mechanism 338 that supports application developers' creation and management of applications, which may be saved as metadata into the tenant data storage 222 by the save routines 336 for execution by subscribers as one or more tenant process spaces 304 managed by the tenant management process 310 for example. Invocations to such applications may be coded using the PL/SOQL 334 that provides a programming language style interface extension to the API 332. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 316 for the subscriber making the invocation and executing the metadata as an application in a virtual machine.

Each application server 300 may be communicably coupled to database systems, e.g., having access to the system data 225 and the tenant data 223, via a different network connection. For example, one application server $300_1$ might be coupled via the network 214 (e.g., the Internet), another application server $300_{N-1}$ might be coupled via a direct network link, and another application server $300_N$ might be coupled by yet a different network connection. Transfer Control Protocol and Internet Protocol (TCP/IP) are typical protocols for communicating between application servers 300 and the database system. However, it will be apparent to one skilled in the art that other transport protocols may be used to optimize the system depending on the network interconnect used.

In certain embodiments, each application server 300 is configured to handle requests for any user associated with any organization that is a tenant. Because it is desirable to be able to add and remove application servers from the server pool at any time for any reason, there is preferably no server affinity for a user and/or organization to a specific application server 300. In one embodiment, therefore, an interface system implementing a load balancing function (e.g., an F5 Big-IP load balancer) is communicably coupled between the application servers 300 and the user systems 212 to distribute requests to the application servers 300. In one embodiment, the load balancer uses a least connections algorithm to route user requests to the application servers 300. Other examples of load balancing algorithms, such as round robin and observed response time, also can be used. For example, in certain embodiments, three consecutive requests from the same user could hit three different application servers 300, and three requests from different users could hit the same application server 300. In this manner, the system 216 is multi-tenant, wherein the system 216 handles storage of, and access to, different objects, data and applications across disparate users and organizations.

As an example of storage, one tenant might be a company that employs a sales force where each salesperson uses the system 216 to manage their sales process. Thus, a user might maintain contact data, leads data, customer follow-up data, performance data, goals and progress data, etc., all applicable to that user's personal sales process (e.g., in the tenant data storage 222). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 216 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 216 might also maintain system level data usable by multiple tenants or other data. Such system level data might include industry reports, news, postings, and the like that are sharable among tenants.

In certain embodiments, the user systems 212 (which may be client systems) communicate with the application servers 300 to request and update system-level and tenant-level data from the system 216 that may require sending one or more queries to the tenant data storage 222 and/or the system data storage 224. The system 216 (e.g., an application server 300 in the system 216) automatically generates one or more SQL statements (e.g., one or more SQL queries) that are designed to access the desired information. The system data storage 224 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for a transforming time series data points from concurrent processes, the system comprising:
   one or more processors; and
   a non-transitory computer readable medium storing a plurality of instructions, which when executed, cause the one or more processors to:
   write to a queue a first time series data point received from a first process associated with a first computer amongst a cluster of computers;
   write to the queue a second time series data point received from a second process associated with a second computer amongst the cluster of computers, the second process executing concurrently with the first process;
   move the first time series data point and the second time series data point from the queue to a first data buffer of a non-persistent storage, the first time series data point and the second time series data point moved in response to determining the queue has stored a predetermined amount of time series data from the cluster of computers for a time period corresponding to the first time series data point and the second time series data point;
   create transformed time series data by applying a transformation to the moved first time series data point and the moved second time series data point of the first data buffer, and writing the transformed time series data to a second data buffer of the non-persistent storage;
   write the transformed time series data, the first time series data point, and the second time series data point to a persistent storage after applying the transformation to create the transformed time series data; and
   output the transformed time series data to a user device.

2. The system of claim 1, wherein writing the first time series data point to the queue comprises protecting the queue from other access, writing the first time series data point to the protected access queue, and enabling other access to the protected access queue; and writing the second time series data point to the queue comprises protecting the queue from other access, writing the second time series data point to the protected access queue, and enabling other access to the protected access queue.

3. The system of claim 1, wherein moving the first time series data point and the second time series data point from the queue comprises protecting the queue from other access, removing the first time series data point and the second time series data point from the protected access queue, and enabling other access to the protected access queue.

4. The system of claim 1, wherein the first data buffer of the non-persistent storage comprises a raw data buffer.

5. The system of claim 4, wherein creating the transformed time series data by applying the transformation to the first time series data point and the second time series data point comprises applying the transformation to a copy of the first time series data point from the raw data buffer and a copy of the second time series data point from the raw data buffer, and wherein the second data buffer of the non-persistent storage comprises a transformed data buffer.

6. The system of claim 1, comprising further instructions, which when executed, cause the one or more processors to:
   create additional transformed time series data by applying an additional transformation to one of the transformed time series data and a set of the first time series data point and the second time series data point;

write the additional transformed time series data to data storage; and output the additional transformed time series data to the user device.

7. A computer program product comprising computer-readable program code to be executed by one or more processors when retrieved from a non-transitory computer-readable medium, the program code including instructions to:

write to a queue, by a time series database system, a first time series data point received from a first process associated with a first computer amongst a cluster of computers;

write to the queue, by the time series database system, a second time series data point received from a second process associated with a second computer amongst the cluster of computers, the second process executing concurrently with the first process;

move, by the time series database system, the first time series data point and the second time series data point from the queue to a first data buffer of a non-persistent storage, the first time series data point and the second time series data point moved in response to determining the queue has stored a predetermined amount of time series data from the cluster of computers for a time period corresponding to the first time series data point and the second time series data point;

create, by the time series database system, transformed time series data by applying a transformation to the moved first time series data point and the moved second time series data point of the first data buffer, and write the transformed time series data to a second data buffer of the non-persistent storage; write the transformed time series data, the first time series data point, and the second time series data point to a persistent storage after applying the transformation to create the transformed time series data; and output, by the time series database system, the transformed time series data to a user device.

8. The computer program product of claim 7, wherein writing the first time series data point to the queue comprises protecting the queue from other access, writing the first time series data point to the protected access queue, and enabling other access to the protected access queue; and writing the second time series data point to the queue comprises protecting the queue from other access, writing the second time series data point to the protected access queue, and enabling other access to the protected access queue.

9. The computer program product of claim 7, wherein moving the first time series data point and the second time series data point from the queue comprises protecting the queue from other access, removing the first time series data point and the second time series data point from the protected access queue, and enabling other access to the protected access queue.

10. The computer program product of claim 7, wherein the first data buffer of the non-persistent storage comprises a raw data buffer.

11. The computer program product of claim 10, wherein creating the transformed time series data by applying the transformation to the first time series data point and the second time series data point comprises applying the transformation to a copy of the first time series data point from the raw data buffer and a copy of the second time series data point from the raw data buffer, and wherein the second data buffer of the non-persistent storage comprises a transformed data buffer.

12. The computer program product of claim 7, wherein the program code comprises further instructions to:

create, by the time series database system, additional transformed time series data by applying an additional transformation to one of the transformed time series data and a set of the first time series data point and the second time series data point;

write, by the time series database system, the additional transformed time series data to data storage; and output, by the time series database system, the additional transformed time series data to the user device.

13. A method for transforming time series data points from concurrent processes, the method comprising:

writing to a queue, by a time series database system, a first time series data point received from a first process associated with a first computer amongst a cluster of computers;

writing to the queue, by the time series database system, a second time series data point received from a second process associated with a second computer amongst the cluster of computers, the second process executing concurrently with the first process;

moving, by the time series database system, the first time series data point and the second time series data point from the queue to a first data buffer of a non-persistent storage, the first time series data point and the second time series data point moved in response to determining the queue has stored a predetermined amount of time series data from the cluster of computers for a time period corresponding to the first time series data point and the second time series data point;

creating, by the time series database system, transformed time series data by applying a transformation to the moved first time series data point and the moved second time series data point of the first data buffer, and writing the transformed time series data to a second data buffer of the non-persistent storage; writing the transformed time series data, the first time series data point, and the second time series data point to a persistent storage after applying the transformation to create the transformed time series data; and outputting, by the time series database system, the transformed time series data to a user device.

14. The method of claim 13, wherein writing the first time series data point to the queue comprises protecting the queue from other access, writing the first time series data point to the protected access queue, and enabling other access to the protected access queue; and writing the second time series data point to the queue comprises protecting the queue from other access, writing the second time series data point to the protected access queue, and enabling other access to the protected access queue.

15. The method of claim 13, wherein moving the first time series data point and the second time series data point from the queue comprises protecting the queue from other access, removing the first time series data point and the second time series data point from the protected access queue, and enabling other access to the protected access queue; and wherein the first data buffer of the non-persistent storage comprises a raw data buffer.

16. The method of claim 15, wherein creating the transformed time series data by applying the transformation to the first time series data point and the second time series data point comprises applying the transformation to a copy of the first time series data point from the raw data buffer and a copy of the second time series data point from the raw data buffer, and wherein the second data buffer of the non-persistent storage comprises a transformed data buffer.

17. The method of claim 13, wherein the method further comprises:
- creating, by the time series database system, additional transformed time series data by applying an additional transformation to one of the transformed time series data and a set of the first time series data point and the second time series data point;
- writing, by the time series database system, the additional transformed time series data to data storage; and
- outputting, by the time series database system, the additional transformed time series data to the user device.

\* \* \* \* \*